(12) United States Patent
Nakao et al.

(10) Patent No.: US 6,811,939 B2
(45) Date of Patent: Nov. 2, 2004

(54) FOCUS MONITORING METHOD, FOCUS MONITORING SYSTEM, AND DEVICE FABRICATING METHOD

(75) Inventors: Shuji Nakao, Hyogo (JP); Yuki Miyamoto, Hyogo (JP); Shinroku Maejima, Hyogo (JP)

(73) Assignee: Renesas Technology Corp., Tokyo (JP)

( * ) Notice: Subject to any disclaimer, the term of this patent is extended or adjusted under 35 U.S.C. 154(b) by 0 days.

(21) Appl. No.: 10/126,607

(22) Filed: Apr. 22, 2002

(65) Prior Publication Data

US 2003/0031943 A1 Feb. 13, 2003

(30) Foreign Application Priority Data

Aug. 9, 2001 (JP) ........................................ 2001-241865

(51) Int. Cl.[7] ................................................ G03F 9/00
(52) U.S. Cl. ............................ 430/30; 430/22; 355/18; 356/400
(58) Field of Search ........................ 430/22, 30; 355/18; 356/400

(56) References Cited

U.S. PATENT DOCUMENTS

| | | | | |
|---|---|---|---|---|
| 5,300,786 A | * | 4/1994 | Brunner et al. | 250/548 |
| 5,936,738 A | * | 8/1999 | Liebmann et al. | 356/401 |
| 6,535,280 B1 | * | 3/2003 | La Fontaine et al. | 356/123 |

FOREIGN PATENT DOCUMENTS

| | | |
|---|---|---|
| JP | 4-146437 | 5/1992 |
| JP | 6-196388 | 7/1994 |
| JP | 6-325998 | 11/1994 |
| JP | 8-22938 | 1/1996 |
| JP | 9-326343 | 12/1997 |
| KR | 1998-5334 | 3/1998 |

OTHER PUBLICATIONS

T.A. Brunner et al., "Simulations and experiments with the phase shift focus monitor", SPIE vol. 2726, pp. 236–243, 1996.

* cited by examiner

*Primary Examiner*—Christopher G. Young
(74) *Attorney, Agent, or Firm*—McDermott Will & Emery LLP (57) ABSTRACT

A focus monitoring method of the invention is characterized by transferring the pattern of a photo mask for phase shift focus monitor onto a photoresist on a semiconductor substrate by using modified illumination. Photo mask for phase shift focus monitor has first and second light transmitting portions which are adjacent to each other while sandwiching a shielding pattern, and is constructed so that a phase difference other than 180 degrees occurs between exposure light passed through the first light transmitting portion and exposure light passed through the second light transmitting portion. Consequently, a focus monitoring method, a focus monitor system, and a semiconductor fabricating method with high detection sensitivity in the z direction and which do not require changing of an illumination aperture can be achieved.

8 Claims, 11 Drawing Sheets

ILLUMINATION HAVING HIGH
COHERENCE AND LOW σ VALUE

FOCUS MONITORING METHOD, FOCUS MONITORING SYSTEM, AND DEVICE FABRICATING METHOD

BACKGROUND OF THE INVENTION

1. Field of the Invention

The present invention relates to a focus monitoring method, a focus monitoring system, and a device fabricating method. More particularly, the invention relates to a focus monitoring method, a focus monitoring system, and a device fabricating method for use in generation of a pattern of a device.

2. Description of the Background Art

Increase in packing density and reduction in size of a semiconductor integrated circuit in recent years is remarkable. In association with this, a circuit pattern formed on a semiconductor substrate (hereinafter, simply called a wafer) is rapidly becoming finer.

In particular, the photolithography technique is widely recognized as a basic technique of generating a pattern. It has been therefore variously developed and modified until today. The pattern is continuously becoming finer and a demand on improvement of the resolution of the pattern is increasing.

The photolithography technique is a technique of transferring a pattern on a photo mask (original image) onto a photoresist applied on a wafer and patterning an underlayer to be etched by using the transferred photoresist.

At the time of transferring the photoresist, the photoresist is subjected to a developing process. In a photoresist of the positive type, the photoresist irradiated with light in the developing process is removed. In a photoresist of the negative type, the photoresist which is not irradiated with light is removed.

Generally, a resolution limit R(nm) in the photolithography technique using a stepper method is expressed as follows.

$$R = k_1 \cdot \lambda/(NA)$$

where $\lambda$ is a wavelength (nm) of light used, NA denotes numerical aperture of a projection optical system of a lens, and $k_1$ is a constant depending on image forming conditions and resist process.

As understood from the expression, to improve the resolution limit R, that is, to obtain a finer pattern, a method of setting each of $k_1$ and $\lambda$ to a small value and setting NA to a large value can be considered. That is, it is sufficient to set a lower constant which depends on the resist process, shorten the wavelength, and set a larger NA.

It is however difficult from the technical point of view to improve a light source and a lens. By shortening the wavelength and setting a larger NA, a focal depth $\delta$ ($\delta = k_2 \cdot \lambda/(NA)^2$) of light decreases, and a program such as deterioration in the resolution arises.

In the photolithography technique, to expose and transfer the pattern of a photo mask onto a photoresist with high resolution, the photo mask has to be exposed in a state where the photoresist is fit in the range of the depth of focus with respect to the best focus plane of the projection optical system. For this purpose, the position of the best focus plane of the projection optical system, that is, the best focus position has to be calculated by any method.

An example of a conventional focus monitor for measuring the best focus position is a phase shift focus monitor developed by Brunner of IBM corporation and sold by Benchmark Technology Co., U.S.A.

Figure 16:
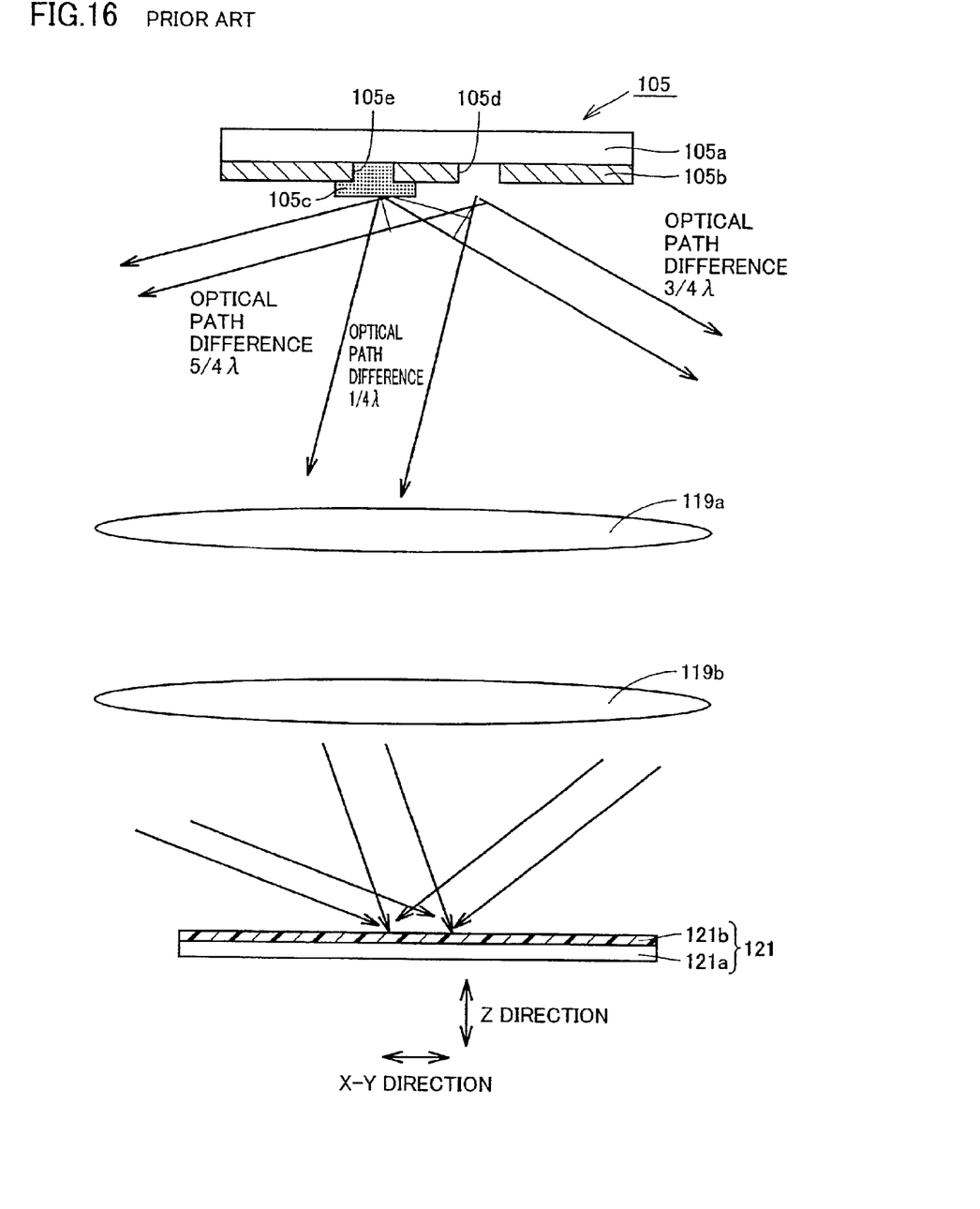
FIG. 16 is a diagram for explaining a conventional phase shift focus monitoring method.

FIG. 16 is a diagram for explaining a phase shift focus monitoring method. Referring to FIG. 16, the phase shift focus monitoring method uses a phase shift mask 105. Phase shift mask 105 has a transparent substrate 105a, a shielding film 105b having a predetermined pattern, and a phase shifter 105c formed on the predetermined pattern.

Figure 17:
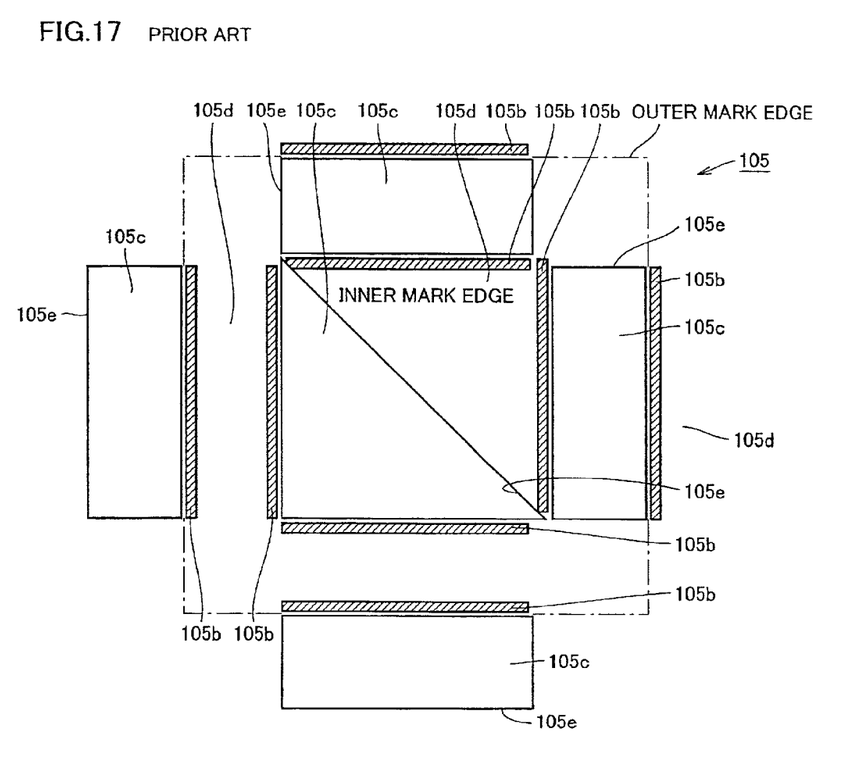
FIG. 17 is a diagram showing the configuration of a photo mask used for the conventional phase shift focus monitoring method.

Phase shift mask 105 has a pattern in which, as concretely shown in FIG. 17, narrow shield pattern 105b is provided between sufficiently thick transmitting portions 105d and 105e. Phase shifter 105c is not disposed in transmitting portion 105d but is disposed in transmitting portion 105e.

According to the phase shift focus monitoring method, referring to FIG. 16, first, phase shift mask 105 is irradiated with light. Since phase shifter 105c is constructed to shift the phase of transmission light by about 90 degrees, in the case where light passed through transmitting portion 105e travels faster than light passed through transmitting portion 105d by an optical path difference of $1/4\lambda$, $5/4\lambda$, ... or in the case where the light passed through transmitting portion 105e travels behind the light passed through transmitting portion 105d by an optical path difference of $3/4\lambda$, $7/4\lambda$, ..., the light strengthens with each other. Consequently, light passed through phase shift mask 105 has an intensity distribution asymmetrical with respect to the z axis (optical axis). Light passed through phase shift mask 105 is condensed by projection lenses 119a and 119b, and an image is formed on a photoresist 121b on a semiconductor substrate 121a.

By the phase shift focus monitor, an image is formed on photoresist 121b in a state where the intensity distribution of diffracted light is asymmetrical with respect to the z axis. With movement of a wafer 121 in the z direction, an image of a pattern on the wafer 121 therefore moves in the direction (x-y direction, that is, the lateral direction of the drawing) perpendicular to the z axis (vertical direction of the drawing). By measuring the shift amount of the image of the pattern in the x-y direction, the position in the z direction, that is, focus can be measured.

In the conventional phase shift focus monitoring method, to obtain high detection sensitivity in the z direction (ratio of the shift amount in the x-y direction to the shift amount in the z direction), isotropic illumination having a small angle (circular shape in a pupil plane), that is, illumination having a small $\sigma$ value has to be used. This is described by T. A. Brunner et al., "Simulations and experiments with the phase shift focus monitor", SPIE Vol. 2726, pp. 236–243. FIG. 4 of this literature teaches that, when the $\sigma$ value is 0.3, the shift amount (focus monitor overlay error) in the x-y direction of a pattern is the largest, and the detection sensitivity in the z direction increases.

In order to obtain illumination having a small $\sigma$ value as described above, for example, as shown in FIG. 18, the diameter of an open portion 14d of an illumination aperture 14 has to be decreased.

Figure 18:
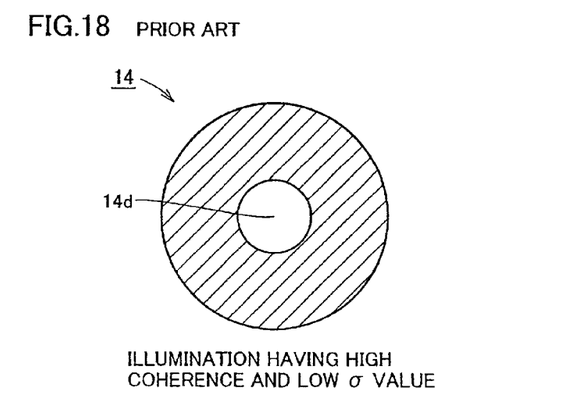
FIG. 18 is a diagram showing the configuration of an illumination aperture used for the conventional phase shift focus monitoring method.

However, when a device pattern is formed with illumination having the $\sigma$ value as small as about 0.3, coherence of light is too strong, and deformation of a two-dimensional pattern transferred onto the photoresist is remarkable. To suppress such deformation of a two-dimensional pattern, the diameter of the illumination aperture 14 used at the time of forming a device pattern is set to be larger than that of illumination aperture 14 used at the time of monitoring a focus, and the $\sigma$ value has to be set to, for example, 0.6 or higher. Consequently, different illumination apertures 14 have to be used for monitoring of a focus and formation of a device pattern. There is a problem such that effort and management for changing illumination aperture 14 are required.

When oxygen entered in the illumination optical system at the time of the change remains, the lens is clouded up. Consequently, the oxygen has to be purged by introducing nitrogen for long time after the change, and a problem such that the work becomes complicated occurs.

SUMMARY OF THE INVENTION

An object of the invention is to provide a focus monitoring method, a focus monitor system, and a device fabricating method with high detection sensitivity in the z direction while an illumination aperture does not have to be changed.

According to the invention, there is provided a focus monitoring method used for forming a pattern of a device, wherein a pattern of a photo mask for phase shift focus monitor, the photo mask having first and second light transmitting areas adjacent to each other while sandwiching a shielding film, is transferred onto a photosensitive member on a substrate by using modified illumination, the pattern being constructed so that a phase difference other than 180 degrees occurs between exposure light passed through the first light transmitting area and exposure light passed through the second light transmitting area.

According to the focus monitoring method of the invention, by using the modified illumination, without setting a low σ value, the detection sensitivity in the z direction as high as that in the case where standard illumination is used and a low σ value is set can be obtained. Since it is unnecessary to set a low σ value, the illumination aperture does not have to be changed between the time of focus monitoring and the time of formation of a device pattern.

In the focus monitoring method, preferably, the modified illumination is quadrupole illumination by which a shape of a light portion in a pupil plane obtained by eliminating a portion of a cross shape from a circular shape is formed.

By using the quadrupole illumination as modified illumination, the detection sensitivity in the z direction as high as that in the case where standard illumination is used and a low σ value is set can be obtained.

In the focus monitoring method, preferably, the modified illumination is zonal illumination by which a shape of a light portion in a pupil plane, that is a zonal shape sandwiched by two concentric circles is obtained.

As described above, by using, other than the quadrupole illumination, the quadrupole illumination as modified illumination, the detection sensitivity in the z direction as high as that in the case where standard illumination is used and a low σ value is set can be also obtained.

In the focus monitoring method, preferably, when a reduction ratio is r, a ratio (a/R) between a sine (a) of a maximum incident angle onto the photo mask of illumination light generated by an illumination optical system and a sine (R) of a maximum incident light angle in an image formed on the substrate by a projection optical system is 0.9/r or higher.

With the configuration, a preferable detection characteristic in the z direction can be achieved.

In the focus monitoring method, preferably, a ratio (b/R) between a width (2b) of the cross-shaped portion and a diameter (2R) of a pupil is 0.30 or higher.

With the configuration, an excellent pattern can be formed with standard illumination at the time of forming a device pattern.

In the focus monitoring method, preferably, a ratio (b/R) between a diameter (2b) in a pupil plane of an inner circle in the two concentric circles and a diameter (2R) of a pupil is 0.50 or higher.

With the configuration, an excellent pattern can be formed with standard illumination at the time of forming a device pattern.

According to another aspect of the invention, there is provided a focus monitor system used for generation of a pattern of a device, including: an illumination optical system for irradiating a pattern of a photo mask for phase shift focus monitor with modified illumination, the photo mask having first and second light transmitting areas adjacent to each other while sandwiching a shielding film and being constructed so that a phase difference other than 180 degrees occurs between exposure light passed through the first light transmitting area and exposure light passed through the second light transmitting area; and a projection optical system for projecting an image of the pattern of the photo mask onto a photosensitivity member.

According to the focus monitor system of the invention, by using the modified illumination, without setting a low σ value, the detection sensitivity in the z direction as high as that in the case where standard illumination is used and a low σ value is set can be obtained. Since it is unnecessary to set a low σ value, the illumination aperture does not have to be changed between the time of focus monitoring and the time of formation of a device pattern.

A method of fabricating a device is characterized by using any of the focus monitoring methods.

Consequently, the high detection sensitivity in the z direction is achieved and the changing of the illumination aperture becomes unnecessary, so that a very accurate pattern can be formed without requiring management and effort of a changing work.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the invention will be described hereinafter with reference to the drawings.

First Embodiment

Figure 1:
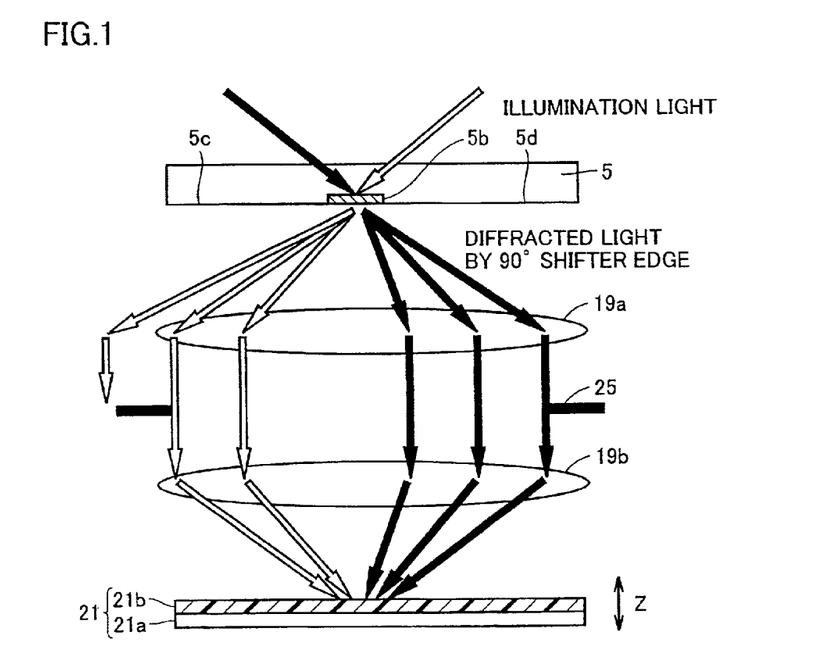
FIG. 1 is a schematic diagram for explaining a focus monitoring method according to a first embodiment of the invention.
Figure 6:
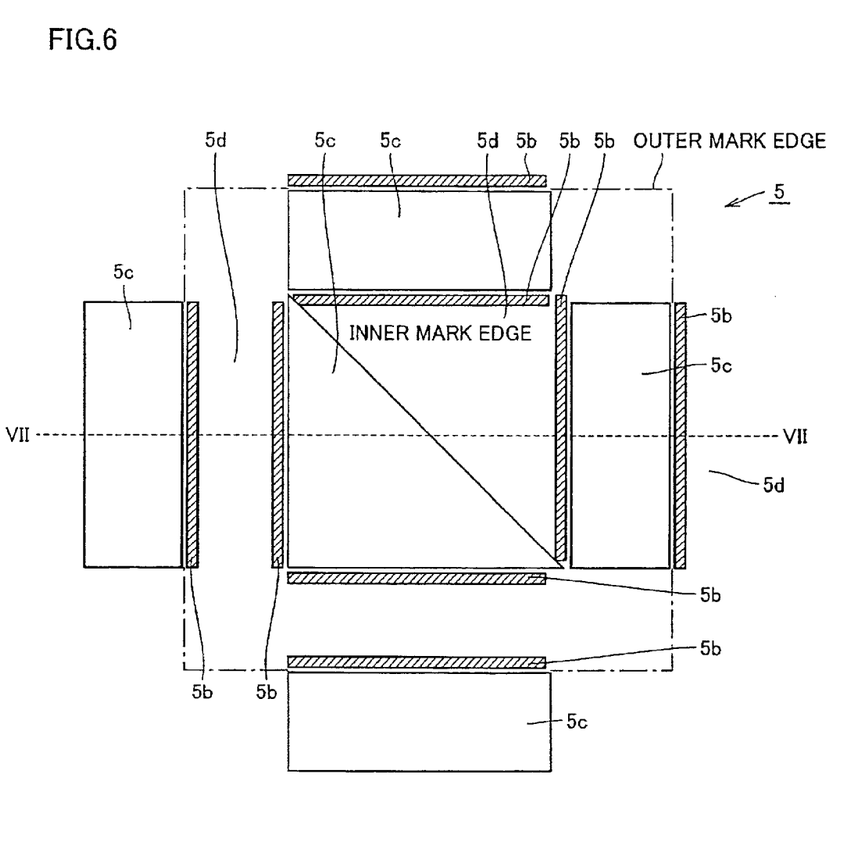
FIG. 6 is a plan view schematically showing the configuration of a photo mask used for the focus monitor system of FIG. 4.
Figure 7:
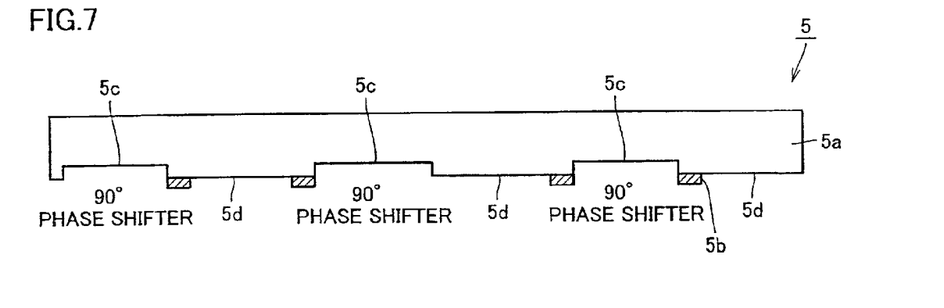
FIG. 7 is a schematic cross section taken along line VII—VII of FIG. 6.

Referring to FIG. 1, in a focus monitoring method of the embodiment, a photo mask 5 takes the form of a photo mask for a phase shift focus monitor. Photo mask 5 for the phase shift focus monitor has at least two light transmitting portions 5c and 5d disposed so as to sandwich a shielding pattern 5b as shown in FIGS. 6 and 7. Two light transmitting portions 5c and 5d are disposed so that a phase difference other than 180 degrees occurs between exposure light passed through light transmitting portion 5c and exposure light passed through light transmitting portion 5d.

In the focus monitor method of the embodiment, shielding pattern 5b of photo mask 5 for the phase shift focus monitor is transferred onto a photosensitive member (such as photoresist) 21b on a semiconductor substrate 21a by modified illumination. Light diffracted by shielding pattern 5b forms an image on photosensitive member 21b via projection lenses 19a and 19b and a pupil plane aperture 25.

In order to avoid lateral shift of a pattern when the focus changes, modified illumination used at the time of forming a device pattern is set so that rays symmetrical with respect to the optical axis always exist. In FIG. 1, a ray indicated by a painted arrow and a ray indicated by a blanked arrow entering photo mask 5 are set to be incident symmetrical with respect to the optical axis.

In the embodiment, photo mask 5 for the phase shift focus monitor is used. Consequently, as described in the conventional technique, the 0-order ray diffracted by shielding pattern 5b is generated in a direction deviated from the incident light by a predetermined angle by phase shift, and high-order diffracted light is generated around the 0-order ray. The diffracted light is generated similarly around the incident light of the painted arrow and the incident light of the blank arrow in the drawing.

By diffraction of photo mask 5 for the phase shift focus monitor, a group of rays (of the blank arrows) is diffracted in the direction to the outside of pupil plane aperture 25, and the other group of rays (of the painted arrows) is diffracted toward the inside of pupil plane aperture 25. In an image formed by the group of rays diffracted toward the outside of pupil plane aperture 25, due to decrease in the amount of diffracted light contributing to formation of an image, the amplitude of the image (energy density) decreases. On the other hand, an image formed by the group of rays diffracted toward the inside of pupil plane aperture 25 has a large amplitude due to increase in the amount of diffracted light contributing the formation of an image.

In the formation of an image, the electric fields of different images do not interfere with each other. Consequently, as a sum of electric field intensity distributions of images formed by the group of rays of the painted arrows and the group of rays of the blank arrows, an image as a total is formed. Specifically, when wafer 21 moves upward in the Z direction, an image is formed as a sum of an image shifted to the left (image formed by the diffracted rays of the blank arrows) and an image shifted to the right (image formed by diffracted rays of the painted arrows). When the amplitudes (intensities) of both of the images are equal to each other, the image is blurred due to shifts of the images, but the position of the image does not change. On the other hand, when the intensities of the images formed with the right and left illumination rays are different from each other, an image shifts to an image having a higher intensity. This will be described by using the intensity distributions of images of FIGS. 2 and 3.

Figure 2:
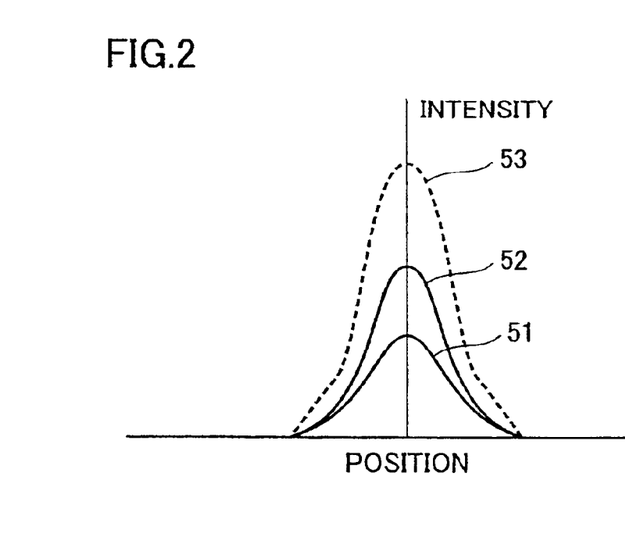
FIG. 2 is a diagram showing a light intensity distribution of an image formed with a right illumination ray, that of an image formed with a left illumination ray, and that of a total image at the time of best focus.

In a state where focus is achieved, there is no positional deviation between the image formed with the diffracted rays of the blank arrows and the image formed with the diffracted rays of the painted arrows in FIG. 1. Consequently, the peak positions of intensity distributions 51 and 52 of the two images formed with the right and left diffracted rays are in the same position as shown in FIG. 2. The peak position of an intensity distribution 53 of the total image is also in the same position.

Figure 3:
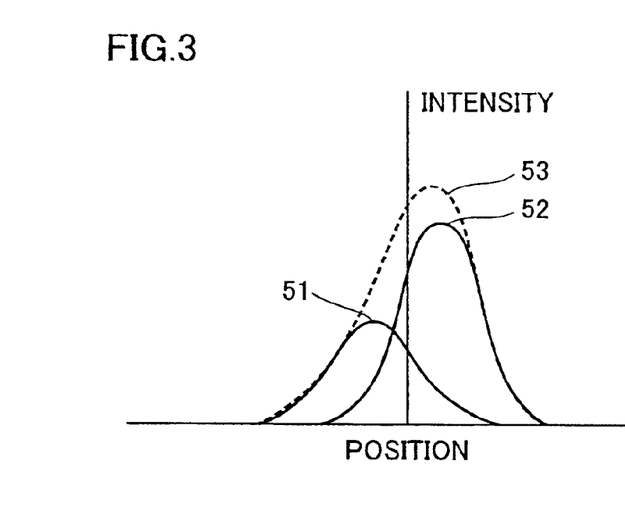
FIG. 3 is a diagram showing a light intensity distribution of an image formed with a right illumination ray, that of an image formed with a left illumination ray, and that of a total image in a state where the focus is not achieved.

On the other hand, when wafer 21 is in a position upper than the focus position in the z direction in FIG. 1, an image formed with the diffracted rays of the blank arrows is positioned on the left side, and an image formed with the diffracted rays of the painted arrows is positioned on the right side. Consequently, as shown in FIG. 3, the peak of the intensity distribution 51 of the left image is positioned on the left side and the peak of intensity distribution 52 of the right image is positioned on the right side. As a result, the peak of intensity distribution 53 of the total image is deviated to the side of an image having higher intensity (right side in the drawing).

As described above, when wafer 21 is moved in the z direction (optical axis direction) to shift the focal point of the image of the pattern, the total image simultaneously moves also in the lateral direction (x-y direction) in the plane of wafer 21. By measuring the shift in the x-y direction, a deviation amount in the z direction from the focus position of wafer 21 can be calculated. By moving wafer 21 in the z direction only by the deviation amount, wafer 21 can be set in the focus position.

The phase difference between the exposure light passed through light transmitting portion 5c and exposure light passed through light transmitting portion 5d may be any angle except for 180 degrees but is preferably around 90 degrees.

The focus monitoring method in the embodiment can be realized by, for example, a system shown in FIGS. 4 to 7.

Figure 4:
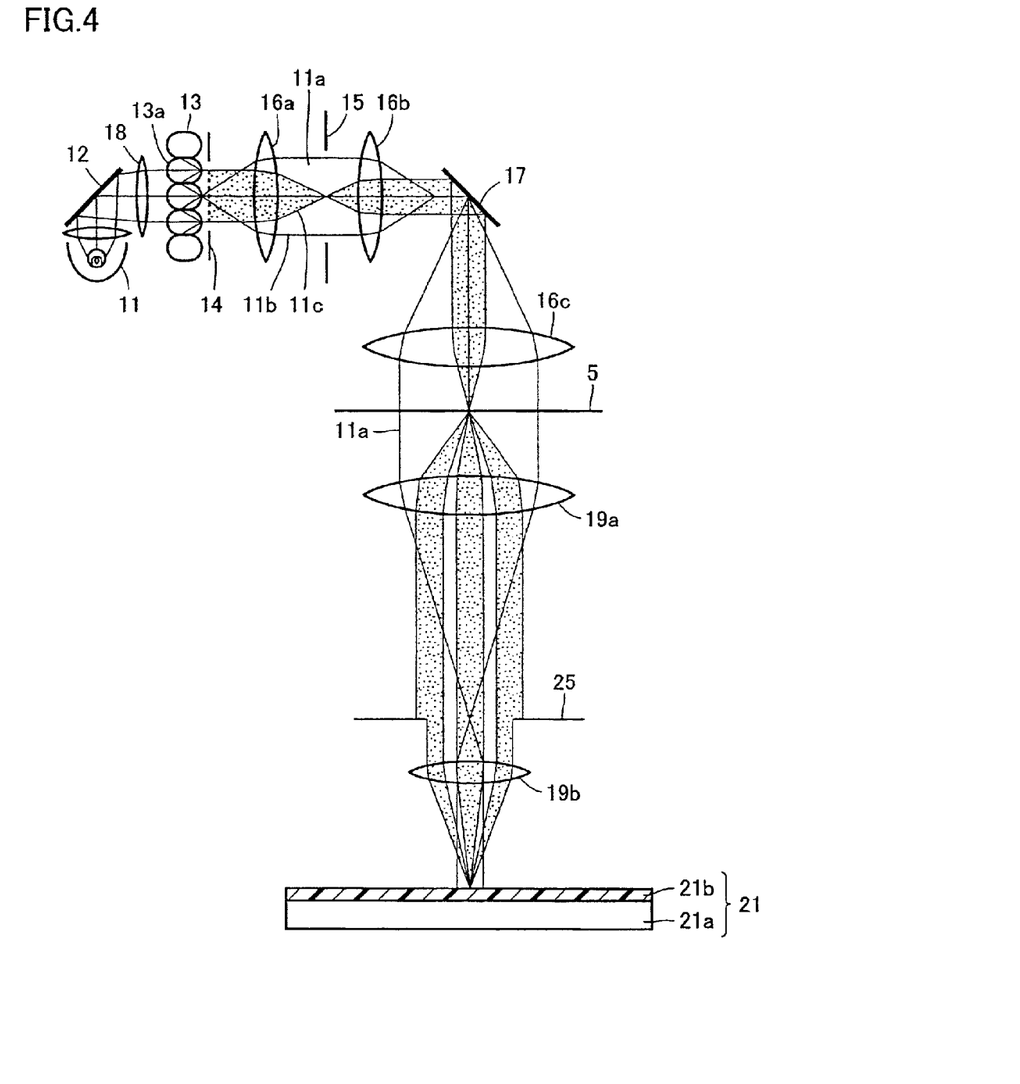
FIG. 4 is a diagram schematically showing the configuration of a focus monitor system for executing the focus monitoring method in the first embodiment of the invention.

Referring to FIG. 4, this focus monitor system has a configuration similar to that of a stepper, reduces a pattern on photo mask 5 and projects the reduced pattern onto photoresist 21b on the surface of wafer 21. The focus monitor system has an illumination optical system from a light source 11 to the pattern of photo mask 5 and a projection optical system from the pattern of photo mask 5 to wafer 21.

The illumination optical system has a mercury lamp 11 as a light source, a reflector 12, a condenser lens 18, a fly-eye lens 13, an aperture 14, condenser lenses 16a, 16b, and 16c, a blind aperture 15, and a reflector 17. The projection optical system has projection lenses 19a and 19b and pupil plane aperture 25.

In the exposing operation, first, light 11a is emitted from mercury lamp 11. For example, only a g-ray (having a wavelength of 436 nm) in light 11a is reflected by reflector 12 and the resultant becomes light having a single wavelength. After that, light 11a passes through condenser lens 18, enters each of lenses 13a constructing fly eye lens 13, and passes through aperture 14.

Light 11b indicates an optical path formed by one of lenses 13a constructing the fly eye. Light 11c indicates an optical path formed by fly-eye lens 13.

Light 11a passed through aperture 14 passes through condenser lens 16a, blind aperture 15, and condenser lens 16b and is reflected by reflector 17 at a predetermined angle.

Light 11a reflected by reflector 17 passes through condenser lens 16c and is uniformly incident on the whole face of photo mask 5 on which a predetermined pattern is formed. After that, light 11a is condensed to a predetermined scaling by projection lenses 19a and 19b. Photo resist 21b on semiconductor substrate 21a is exposed with the resultant light.

Figure 5:
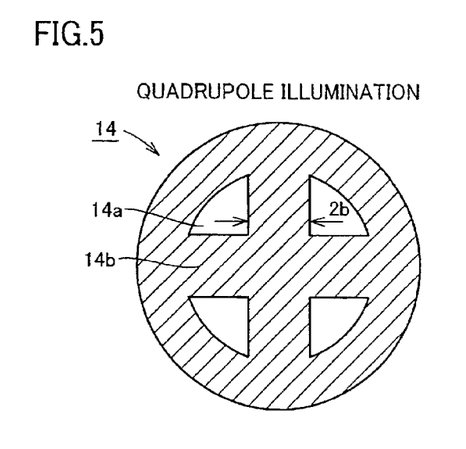
FIG. 5 is a diagram showing the configuration of a quadrupole illumination aperture used for the focus monitor system of FIG. 4.

Referring to FIG. 5, since the focus monitor system uses modified illumination, a quadrupole illumination aperture is used as an aperture 14 disposed on a secondary light source plane of the stepper. Quadrupole illumination aperture 14 has an aperture shape 14a obtained by eliminating a cross-shaped portion 14b from the circular aperture. The modified illumination using quadrupole illumination aperture 14 is therefore has a shape of a light portion on the pupil plane obtained by eliminating the cross-shaped portion from the circular aperture.

Referring to FIGS. 6 and 7, in the focus monitor system, photo mask 5 having a configuration similar to that of the photo mask for the phase shift focus monitor is used. Photo mask 5 has a transparent substrate 5a and shielding pattern 5b. A plurality of lines of shielding pattern 5b is disposed along the outer mark edges and inner mark edges of a square shape. On one side of each of lines of the shielding pattern 5b, light transmitting portion 5c is disposed. On the other side, light transmitting portion 5d is disposed. Photo mask 5 is constructed so that the phase of light passed through light transmitting portion 5c is shifted with respect to the phase of light passed through light transmitting portion 5d by, for example, 90 degrees.

A concrete focus monitoring method in the embodiment will now be described.

Figure 8:
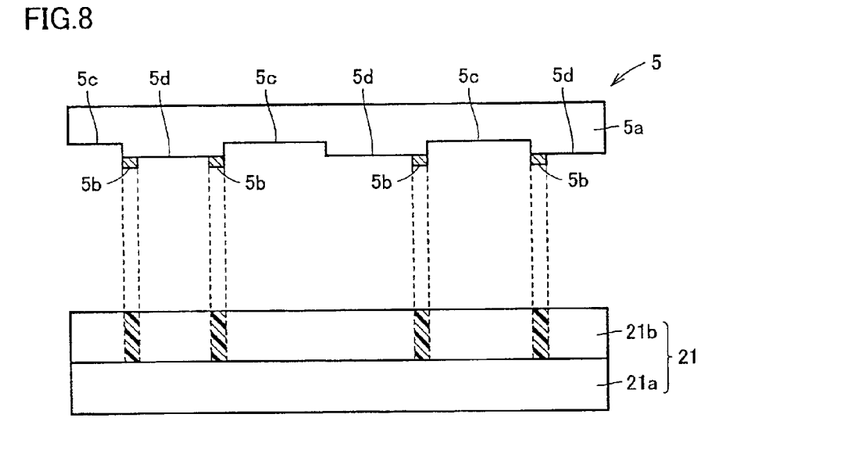
FIG. 8 is a first process drawing for explaining a concrete focus monitoring method in the first embodiment of the invention, showing the sectional configuration of a photo mask and a wafer.

In the focus monitoring method of the embodiment, in the focus monitor system of FIG. 4, photo resist 21b is exposed once by using quadrupole illumination aperture 14 shown in FIG. 5 and photo mask 5 shown in FIGS. 6 and 7. Since the modified illumination and the photo mask for the phase shift focus monitor are used for the exposure, exposure is performed on the principle shown in FIG. 1. As shown in FIG. 8, the area in photoresist 21b except for the area corresponding to shielding pattern 5b of photo mask 5 is exposed. After that, photoresist 21b is developed.

Figure 9:
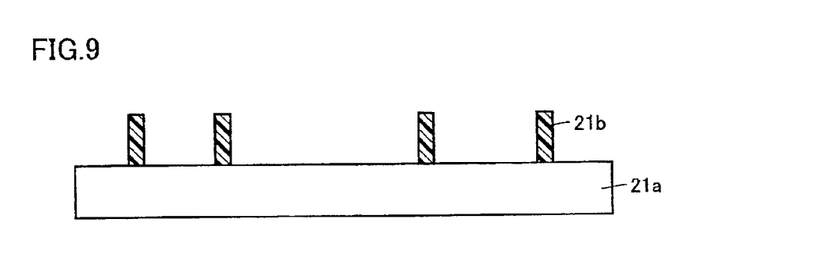
FIG. 9 is a second process drawing for explaining a concrete focus monitoring method in the first embodiment of the invention, showing the sectional configuration of the wafer.

Referring to FIG. 9, in the case where photoresist 21b is a positive-type photoresist, only the exposed portions are removed at the time of development, so that photoresist 21b in the area corresponding to shielding pattern 5b is left.

Figure 10:
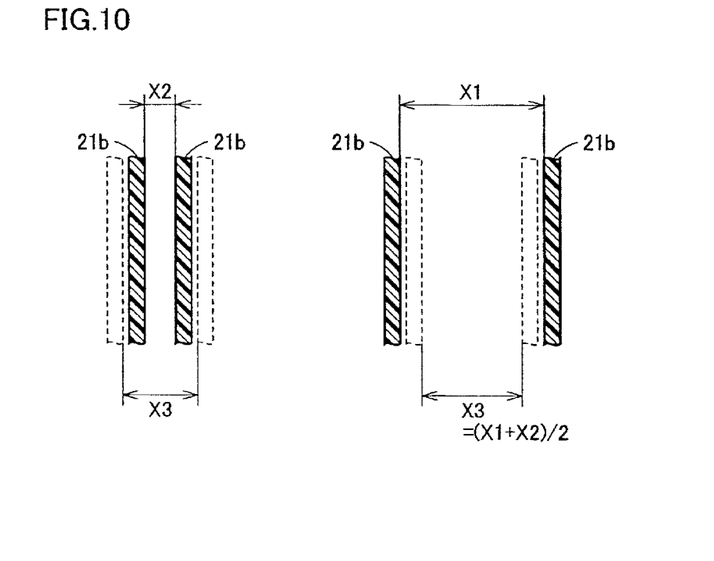
FIG. 10 is a third process drawing for explaining a concrete focus monitoring method in the first embodiment of the invention, showing the structure of the wafer in plan view.

Referring to FIG. 10, when wafer 21 is deviated in the z direction from the focus position, at the time of exposure, resist pattern 21b is formed in a position deviated in the x-y direction from the inherent position (indicated by broken lines). Spaces x1 and x2 each between a pair of lines in resist pattern 21b are measured. From spaces x1 and x2, a space $x3(=(x1+x2)/2)$ at the best focus of the pair of lines in resist pattern 21b can be calculated. By obtaining the difference between the spaces x3 and x1 or x2, the lateral shift amount (positional deviation amount) in the x-y direction of the formation position of the actual pattern from the formation position of the pattern at the best focus can be known. By checking the lateral shift amount with the relation between preliminarily measured lateral shift amount and focus, a focus error can be detected. By adjusting the position of wafer 21 on the basis of the focus error, the best focus can be achieved.

The photoresist on the surface of the wafer is exposed with the best focus obtained by the focus monitoring method and is developed, thereby forming a resist pattern. While using the resist pattern, processes such as etching and ion implantation are performed on an underlayer, thereby enabling a desired semiconductor device to be fabricated with high accuracy.

The detection sensitivity of the focus monitoring method of the embodiment and that of the conventional focus monitoring method were examined. The result is as follows.

Figure 11:
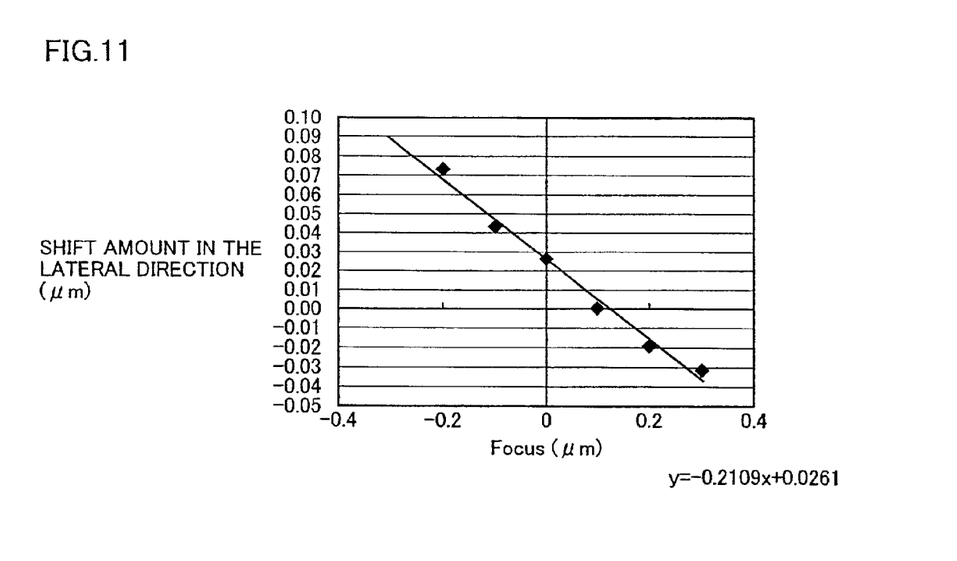
FIG. 11 is a diagram showing a change in the shift amount in the lateral direction with respect to the focus when quadrupole illumination is used and NA is 0.73 in the focus monitoring method in the first embodiment of the invention.
Figure 12:
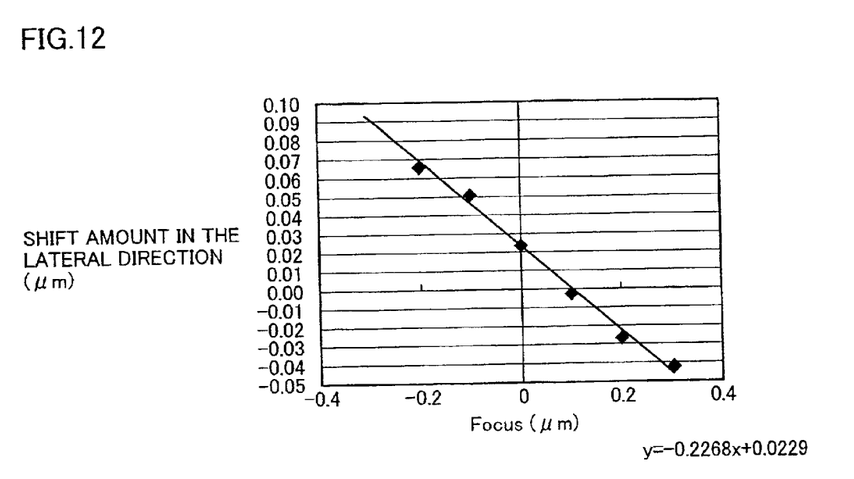
FIG. 12 is a diagram showing a change in the shift amount in the lateral direction with respect to the focus when quadrupole illumination is used and NA is 0.68 in the focus monitoring method in the first embodiment of the invention.
Figure 13:
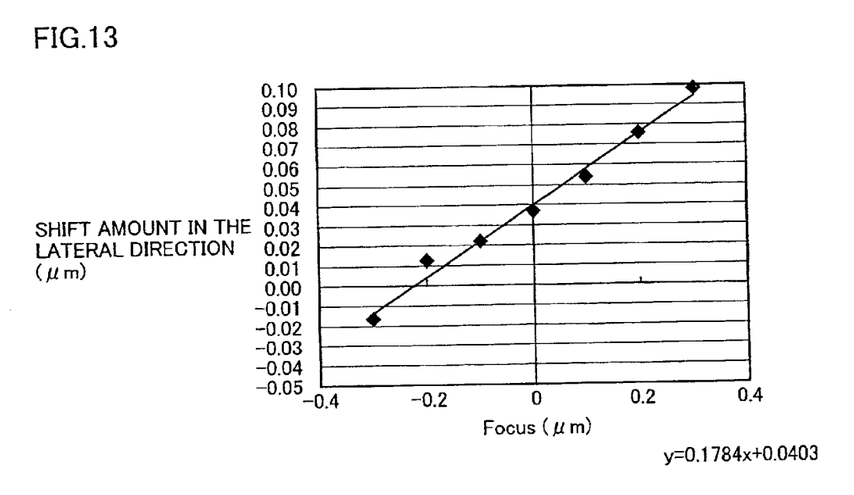
FIG. 13 is a diagram showing a change in the shift amount in the lateral direction with respect to the focus when NA is 0.68 and σ is set to 0.3 in a conventional focus monitoring method.

FIG. 11 shows a change in the lateral shift amount with respect to the focus when quadrupole illumination aperture 14 shown in FIG. 5 is used and NA is set to 0.73. FIG. 12 shows a change in the lateral shift amount with respect to the focus when quadrupole illumination aperture 14 shown in FIG. 5 is used and NA is set to 0.68. FIG. 13 shows a change in the lateral shift amount with respect to the focus when NA is set to 0.68 and (coherency) is Set to 0.3 in the conventional technique using standard illumination shown in FIG. 18.

It is understood that the focus monitoring method of the embodiment shown in FIGS. 11 and 12 can obtain the detection sensitivity in the z direction as high as that of the conventional technique shown in FIG. 13.

In the embodiment, by setting a small NA and making the position in the pupil of illumination relatively closer to the periphery of the pupil, the difference between the image intensity of the right illumination and that of the left illumination can be widened. It is understood that high detection sensitivity in the z direction is achieved as shown in FIG. 12.

According to the embodiment, as described above, by using modified illumination, detection sensitivity in the z direction as high as that in the case where a low σ value is set and standard illumination is used can be obtained without setting the σ value to a low value. Since the σ value does not have to be a low value, it is unnecessary to use different illumination apertures 14 for the focus monitoring and formation of a device pattern.

Second Embodiment

Figure 14:
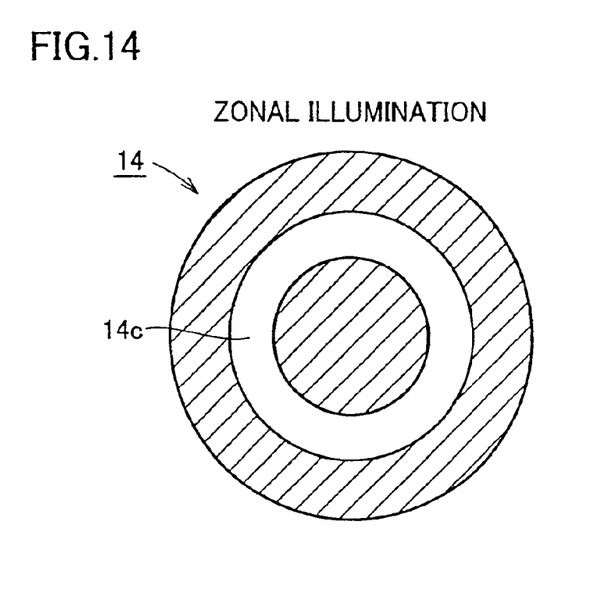
FIG. 14 is a diagram showing the configuration of a zonal illumination aperture used for the focus monitor system of FIG. 4.

In the foregoing first embodiment, the case of using quadrupole illumination shown in FIG. 5 as modified illumination has been described. In place of the quadrupole illumination, zonal illumination may be used. The zonal illumination can be realized by using a zonal illumination aperture 14 as shown in FIG. 14 as illumination aperture 14 of the focus monitor system of FIG. 4. Zonal illumination aperture 14 has an opening 14c of a zonal shape sandwiched by two concentric circles. With the zonal illumination, the shape of a light portion in the pupil plane becomes a zonal shape sandwiched by two concentric circles.

Since the focus monitor system, focus monitoring method, and semiconductor device fabricating method are similar to those of the first embodiment, the description will not be repeated.

Figure 15:
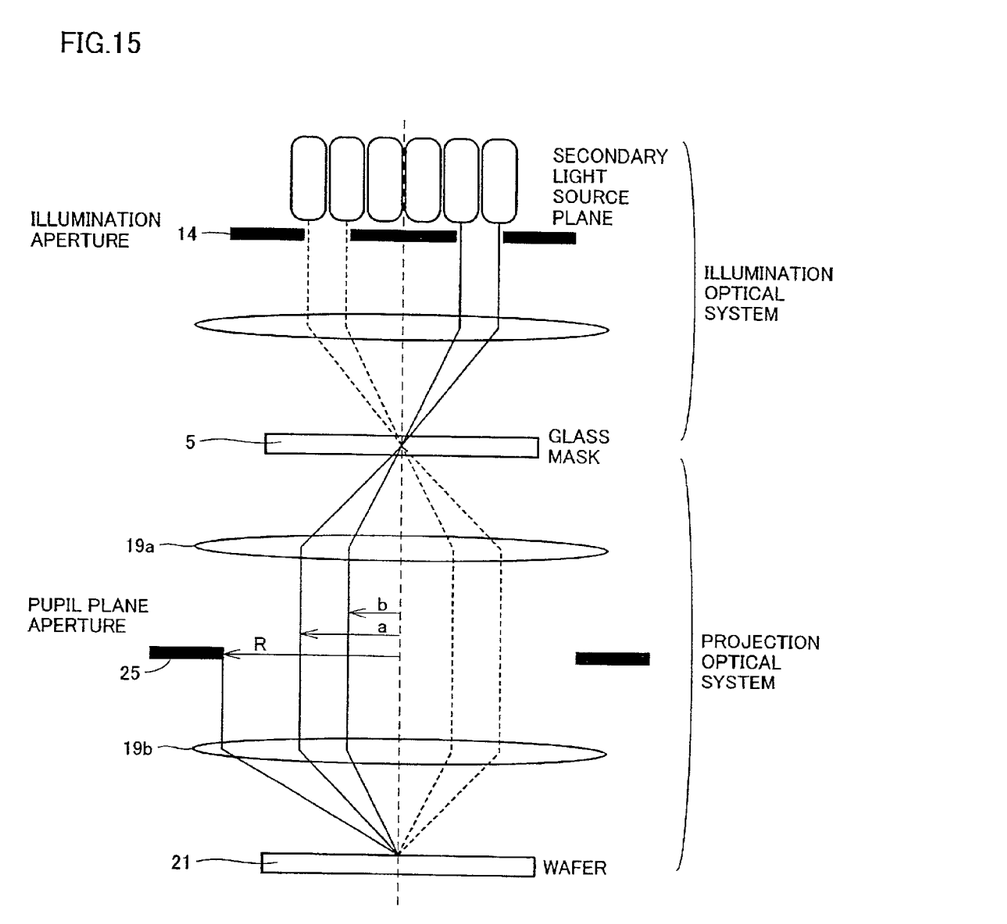
FIG. 15 is a diagram for explaining the definition of parts in modified illumination.

In the foregoing first and second embodiments, as shown in FIG. 15, the radius R of pupil plane aperture 25 is proportional to sine(=NA) of the maximum incident angle of a ray in an image formed. A position (a) in the pupil of illumination light at the maximum incident angle to photo mask 5 is proportional to the sine of the maximum incident angle of illumination. A position (b) in the pupil of illumination light at the minimum incident angle to photo mask 5 is proportional to the sine of the minimum incident angle of illumination. Coherency σ of a coherence index of illumination is equal to a/R in the case of standard illumination. The shape of modified illumination is also expressed by a ratio between the sine of maximum/minimum incident angle and NA and is expressed as $\sigma_{out}=a/R$ and $\sigma_{in}=b/R$. In the description, equimultiple projection is performed, and a reduction ratio (r) of the projection optical system is 1.

In modified illumination, when the reduction ratio is r, it is preferable that the ratio (a/R) between the sine (a) of the maximum incident angle and the sine R of the maximum incident angle of the projection optical system is 0.9/r or higher. In exposure using the quadrupole illumination aperture of FIG. 5, preferably, the ratio (b/R) of width 2b of the cross-shape portion in the pupil plane and the diameter 2R of the pupil is 0.30 or higher. In exposure using the zonal illumination aperture of FIG. 14, it is preferable that the ratio (b/R) between the radius 2b of the pupil plane of the inner circle in the two concentric circles and the diameter 2R of the pupil is 0.50 or higher.

In the foregoing first and second embodiments, the cases of using illumination apertures 14 such as the quadrupole illumination aperture and zonal illumination aperture as shown in FIGS. 5 and 14 to obtain the quadrupole illumination and zonal illumination have been described. The quadrupole illumination or zonal illumination may be realized by a lens other than the illumination aperture or another optical method.

In the above described first and second embodiments, a method of forming a pattern on a semiconductor substrate by a focus monitoring method and system has been described. Application is not limited to the above, and patterns of liquid crystal display devices, thin film magnetic head and other electronic devices may be formed.

The embodiments disclosed herein are to be considered in all respects as illustrative and not restrictive. The scope of the invention is indicated by the appended claims rather than by the foregoing description and all changes which come within the meaning and range of equivalency of the claims are therefore intended to be embraced therein.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A focus monitoring method used for forming a pattern of a device,
    wherein a pattern of a photo mask for phase shift focus monitor, the photo mask having first and second light transmitting areas adjacent to each other while sandwiching a shielding film, is transferred onto a photosensitive member on a substrate by using modified illumination, the pattern being constructed so that a phase difference other than 180 degrees occurs between exposure light passed through said first light transmitting area and exposure light passed through said second light transmitting area.

2. The focus monitoring method according to claim 1, wherein said modified illumination is quadrupole illumination by which a shape of a light portion in a pupil plane obtained by eliminating a portion of a cross shape from a circular shape is formed.

3. The focus monitoring method according to claim 1, wherein said modified illumination is zonal illumination by which a shape of a light portion in a pupil plane, that is a zonal shape sandwiched by two concentric circles is obtained.

4. The focus monitoring method according to claim 1, wherein when a reduction ratio is r, a ratio (a/R) between a sine (a) of a maximum incident angle onto said photo mask of illumination light generated by an illumination optical system and a sine (R) of a maximum incident light angle in an image formed on said substrate by a projection optical system is 0.9/r or higher.

5. The focus monitoring method according to claim 2, wherein a ratio (b/R) between a width (2b) of said cross-shaped portion and a diameter (2R) of a pupil is 0.30 or higher.

6. The focus monitoring method according to claim 3, wherein a ratio (b/R) between a diameter (2b) in a pupil plane of an inner circle in said two concentric circles and a diameter (2R) of a pupil is 0.50 or higher.

7. A focus monitor system used for generation of a pattern of a device, comprising:
    an illumination optical system for irradiating a pattern of a photo mask for phase shift focus monitor with modified illumination, the photo mask having first and second light transmitting areas adjacent to each other while sandwiching a shielding film, being constructed so that a phase difference other than 180 degrees occurs between exposure light passed through said first light transmitting area and exposure light passed through said second light transmitting area; and
    a projection optical system for projecting an image of the pattern of said photo mask onto a photosensitivity member.

8. The method of fabricating a device, wherein the focus monitoring method according to claim 1 is used.

* * * * *